United States Patent
Bederka et al.

(10) Patent No.: US 7,448,645 B2
(45) Date of Patent: Nov. 11, 2008

(54) CONTOURED SIDE IMPACT AIRBAG

(75) Inventors: James Bederka, Northville, MI (US);
David Zhao, Northville, MI (US); Krish Aekbote, Farmington Hills, MI (US);
Leonard Shaner, New Baltimore, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 49 days.

(21) Appl. No.: 11/278,292

(22) Filed: Mar. 31, 2006

(65) Prior Publication Data

US 2007/0228699 A1 Oct. 4, 2007

(51) Int. Cl.
*B60R 21/16* (2006.01)
(52) U.S. Cl. .................................. 280/730.2
(58) Field of Classification Search .............. 280/730.2, 280/743.1, 740
See application file for complete search history.

(56) References Cited

U.S. PATENT DOCUMENTS

| | | | |
|---|---|---|---|
| 5,556,128 A * | 9/1996 | Sinnhuber et al. ........ | 280/730.2 |
| 5,722,685 A * | 3/1998 | Eyrainer ................... | 280/730.2 |
| 6,213,500 B1 * | 4/2001 | Jost et al. ................. | 280/730.2 |
| 6,364,348 B1 | 4/2002 | Jang et al. | |
| 6,550,809 B1 * | 4/2003 | Masuda et al. ........... | 280/743.1 |
| 7,021,652 B2 * | 4/2006 | Kumagai et al. ............ | 280/729 |
| 7,168,733 B2 * | 1/2007 | Kumagai et al. ......... | 280/730.2 |
| 2003/0168836 A1 | 9/2003 | Sato et al. | |
| 2004/0124615 A1 | 7/2004 | Tanase et al. | |
| 2004/0130127 A1 | 7/2004 | Kurimoto et al. | |
| 2005/0062266 A1 | 3/2005 | Steimke et al. | |
| 2005/0189742 A1 | 9/2005 | Kumagai et al. | |
| 2007/0200327 A1 * | 8/2007 | Kloss et al. ................. | 280/740 |

* cited by examiner

*Primary Examiner*—Paul N. Dickson
*Assistant Examiner*—Robert A. Coker
(74) *Attorney, Agent, or Firm*—Frank A. MacKenzie; Brooks Kushman P.C.

(57) ABSTRACT

A side impact airbag and deployment system including an inflator is provided. The airbag has a generally B-shaped, or hour-glass, configuration and has a broad shoulder loading portion, a narrow central portion, and a broad pelvis loading portion.

10 Claims, 3 Drawing Sheets

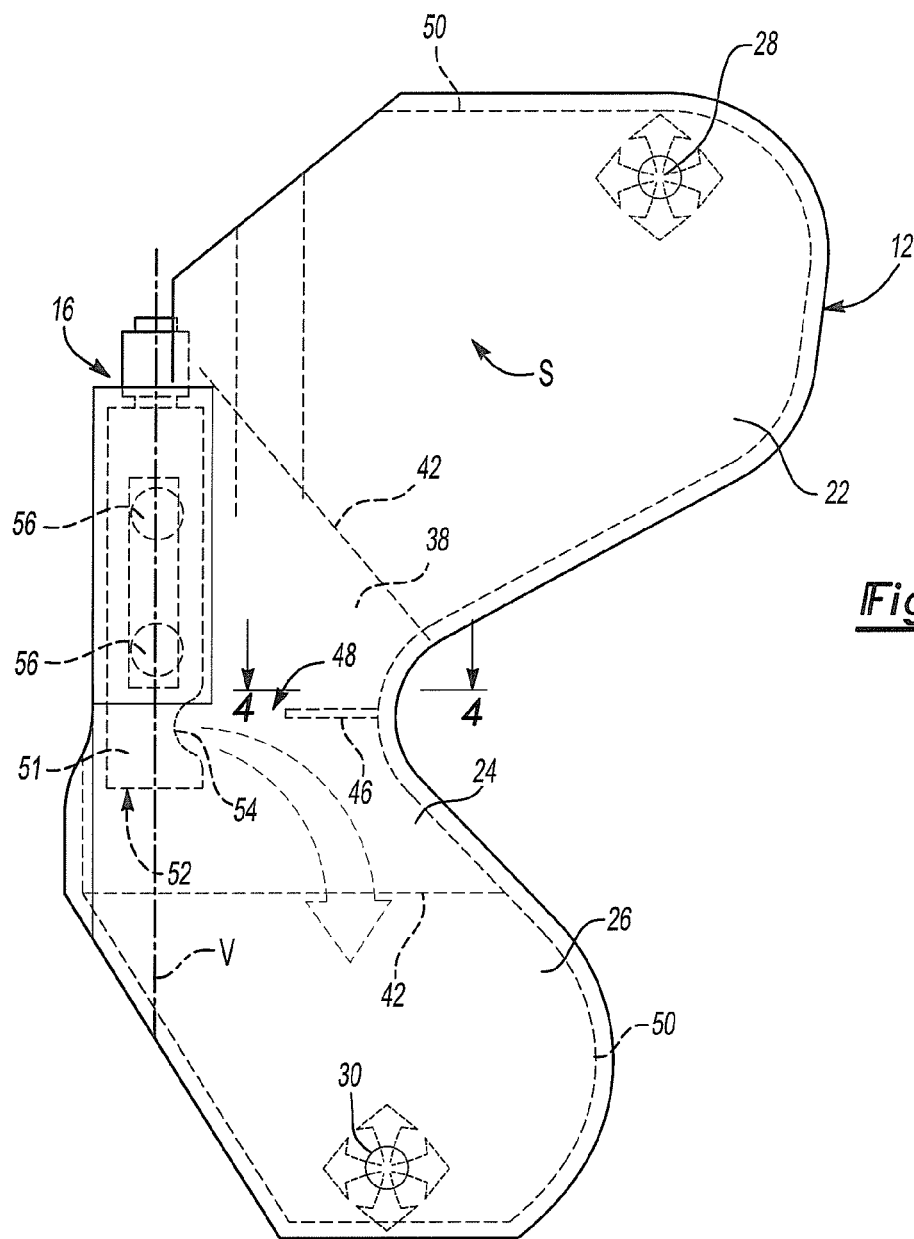
*Fig-3*
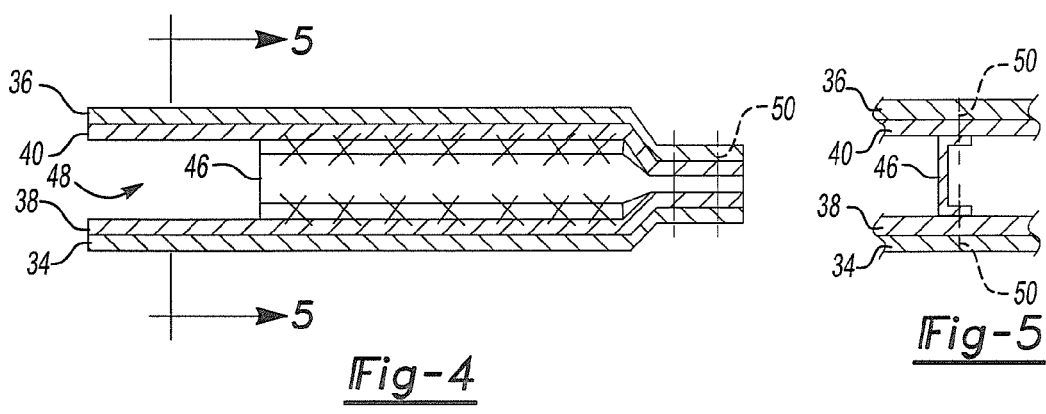
*Fig-4*  *Fig-5*

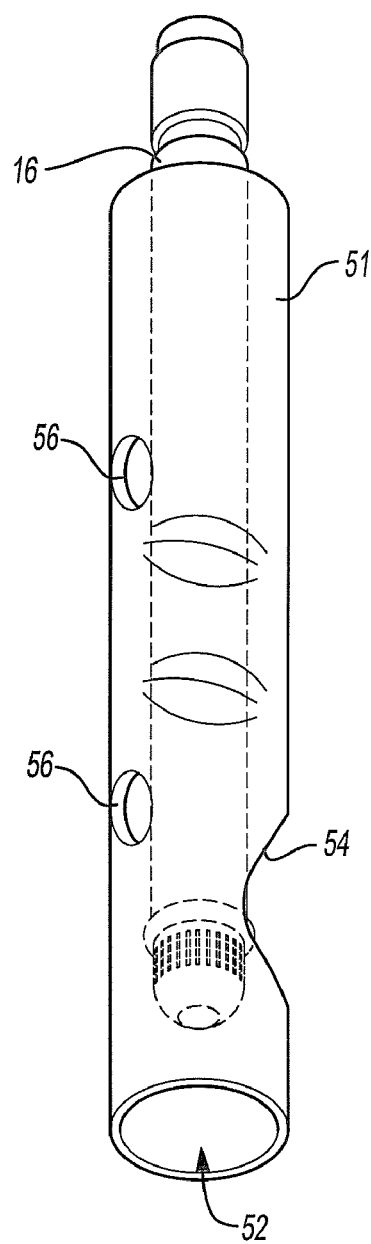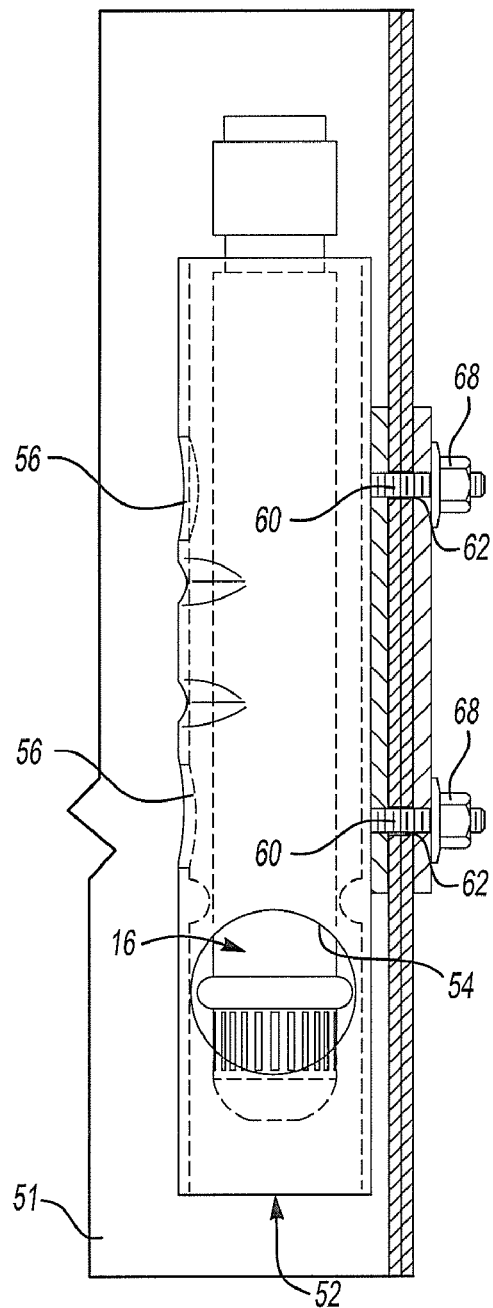
Fig-6
Fig-7

CONTOURED SIDE IMPACT AIRBAG

BACKGROUND OF THE INVENTION

1. Field of the Invention

The present invention relates to side impact airbags for vehicles.

2. Background Art

Vehicle airbags are used to protect vehicle occupants in the event of a collision. Airbags were initially provided on the dashboard and steering wheel of vehicles to protect against front end collisions. More recently, side impact airbags have been developed to protect vehicle occupants in the event of a side impact. Side impact airbags are inflated by an inflator that inflates the airbag with a gaseous medium when an impact is detected by side impact sensors provided on the vehicle.

Some prior art side impact airbags when inflated extend from a mounting location on one side of a seat back forwardly between the vehicle door and the occupant to cover the entire side of an occupant's body. This type of side impact airbag, when deployed, extends across the rib cage of an occupant's body. Such airbags may cause additional unwanted rib deflection as they press against rib cage that is generally less robust than a person's hip or shoulder.

Conventional wisdom is that a side impact airbag should be inflated to place a cushion between a vehicle body part intruding into the passenger cabin and a person's body in the event of an impact. However, side impact airbags inflate very rapidly while the intruding structure of the vehicle body is moving toward the vehicle occupant.

One problem with prior art side impact airbags is that the greater the volume of the airbag, the more time is required to deploy the airbag. Larger volume airbags also require larger inflators. Increasing the size of a side impact airbag and its associated inflator also increases the cost of the side impact airbag system. There is a need for a side impact airbag that reduces the time required for full deployment and reduces system cost.

Another problem with side impact airbags is that different areas of the airbag may require different inflation pressure levels and have different size constraints. To address this problem complex baffling arrangements and separate chambering concepts have been proposed. However, complex baffling and separate chambers or separate air bags tend to increase the system cost and may adversely effect deployment performance.

Tests for side impact airbags include the current IIHS high hooded barrier side impact test and a new more severe FMVSS 214 Oblique Pole Test. There is a need to develop side impact airbags that meet all of the requirements of such tests.

There is a need to provide a side impact airbag having a shape that is optimized to manage intruding energy, but not overload the occupant. There is also a need to provide a side impact airbag that loads bio-mechanically appropriate areas of the body. The most appropriate areas for bio-mechanical loading are an occupant's shoulder and pelvis. Bio-mechanical loading of the thorax should be minimized.

The distance between an H point and knee pivot for the $5^{th}$ percentile female anthropomorphic dummy is less than the distance between the H point and knee pivot of a $50^{th}$ percentile male anthropomorphic dummy, requiring the female dummy to sit more forward in the seat. As a result, the $5^{th}$ percentile female anthropomorphic dummy has a pelvis H point that is shifted forward to an extent that is forward of the pelvis H point for the $50^{th}$ percentile male anthropomorphic dummy. This creates a problem for side airbags designed to cover at least a $50^{th}$ percentile male occupant because this does not assure forward coverage for $5^{th}$ percentile females.

Applicants' invention is directed to solving the above problems and fulfilling the above needs as summarized below.

SUMMARY OF THE INVENTION

According to one aspect of the present invention an airbag system is provided for protecting an occupant of a vehicle. The system includes a sensor for sensing whether the vehicle is involved in a collision and generates a collision detection signal. A controller receives the collision detection signal from the sensor and generates an activation signal. A gas generator generates a gas in response to receiving the activation signal from the controller. The gas generator has at least one port through which the gas is expelled. The system also includes a distinct upper chamber positioned to load the occupant's shoulder, and a distinct lower chamber positioned to load the occupant's pelvis. The gas generator is assembled into the central portion of the airbag so that gas is expelled directly into the pelvis loading portion with the gas being expelled indirectly into the shoulder portion through the central portion.

According to another aspect of the present invention, an airbag assembly is provided for a vehicle occupant protection system. The airbag comprises an inflatable fabric enclosure having a pelvis loading portion, a shoulder loading portion and a constricted central portion. The enclosure is simply formed by an inner wall, an outer wall, a simple baffle, an inner wall reinforcement panel, and an outer wall reinforcement panel. The reinforcement panels and baffle are disposed in the central portion. An inflator is assembled to the enclosure at the central portion. The inflator has a plurality of ports through which a volume of gas is dispensed. The majority of the gas is dispensed through a port directly into the pelvis loading portion. Gas is provided to the shoulder portion through the constricted central portion.

According to yet another aspect of the present invention, an airbag assembly is provided for a vehicle occupant protection system. The airbag assembly comprises an inflatable fabric enclosure having a pelvis loading portion, a shoulder loading portion and a central portion. The pelvis loading portion extends downwardly and forward from the central portion. The shoulder loading portion is disposed above and extends forward of the central portion. The central portion is constricted longitudinally to a design location corresponding to the position of the occupant's back. The central portion is configured to avoid transferring loads to the more sensitive thorax region of the occupant. An inflator is assembled to the inflatable fabric enclosure at the central portion. The gas is supplied to the enclosure in a controlled manner to provide pressure at a first level in the pelvis loading portion and at a second level in the shoulder portion. The second level of pressure is intended to be less then the first level of pressure. Gas is permitted to flow through the central portion with restrictions in the central portion maintaining the difference between the first and second levels of pressure during a deployment phase.

According to other aspects of the present invention, the airbag has an inside wall and an outside wall that each extend over the pelvis loading portion, the central portion and the shoulder loading portion. The central portion has an inner reinforcement layer that is secured to the inside wall and an outer reinforcement layer that is secured to the outside wall.

According to other aspects of the present invention, the airbag may be in a B-shape which as used in this application should be construed as a capital B-shape. The B-shape has a vertical axis and is formed by an upper lobe that is configured to target the shoulder for loading, a lower lobe that is configured to target the pelvis for loading, and a constricted central portion that is configured to avoid loading the thorax of a seat occupant.

According to other aspects of the present invention, the cross-sectional area of the central portion when fully inflated is less than the cross-sectional area of the pelvis loading portion and the shoulder loading portion when fully inflated. The degree of reduction of cross-sectional area of the central portion may be controlled by providing at least one baffle that extends at least partially across the central portion. A gap, or window, is provided in the baffle that may apportion gas flow between the upper and lower lobes. The window location relative to the inflator may be determined based upon the desired apportionment of gas flow volume in the respective regions of the airbag.

According to another aspect of the present invention, the gas generator may be attached to a vehicle seat back and to the airbag. The gas generator is positioned within the airbag with a port oriented to direct the flow of gas downwardly into the pelvis loading portion. The window may be oriented to control gas flow into the upper portion and the central portion. First and second vent holes may be provided in the pelvis loading portion and the shoulder loading portion, respectively.

The gas generator may be secured to a vehicle seat back and to the airbag at the central portion of the airbag. The shoulder loading portion and pelvis loading portion are designed to extend vertically and horizontally sufficiently to load a shoulder and a pelvis of the occupant provided that the occupant is between $5^{th}$ percentile female and $50^{th}$ percentile male of the average population height.

These and other aspects of the present invention will be better understood in view of the attached drawings and following detailed description of the illustrated embodiment of the invention.

BRIEF DESCRIPTION OF THE DRAWINGS

FIG. 3 is a side elevation view of an airbag and inflator;

FIG. 4 is a cross-sectional view taken along the line 4-4 in FIG. 3;

FIG. 5 is a cross-sectional view taken along the line 5-5 in FIG. 4;

FIG. 6 is a perspective view of an inflator; and

FIG. 7 is a fragmentary cross-sectional view showing the inflator attached to a portion of the airbag.

DETAILED DESCRIPTION OF THE PREFERRED EMBODIMENT(S)

Figure 1:
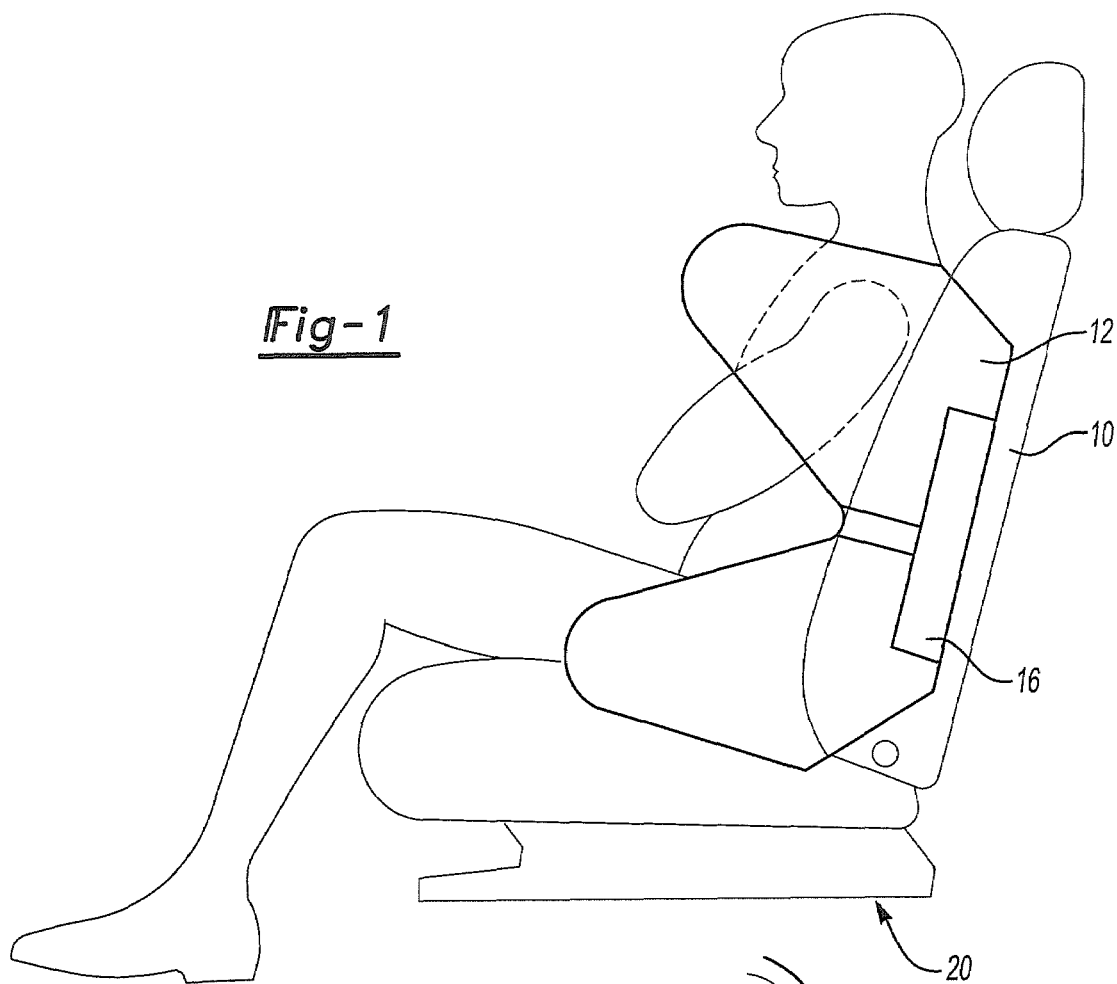
FIG. 1 is a side elevation view of a vehicle seat showing an occupant, an airbag and an airbag inflator in the inflated condition.
Figure 2:
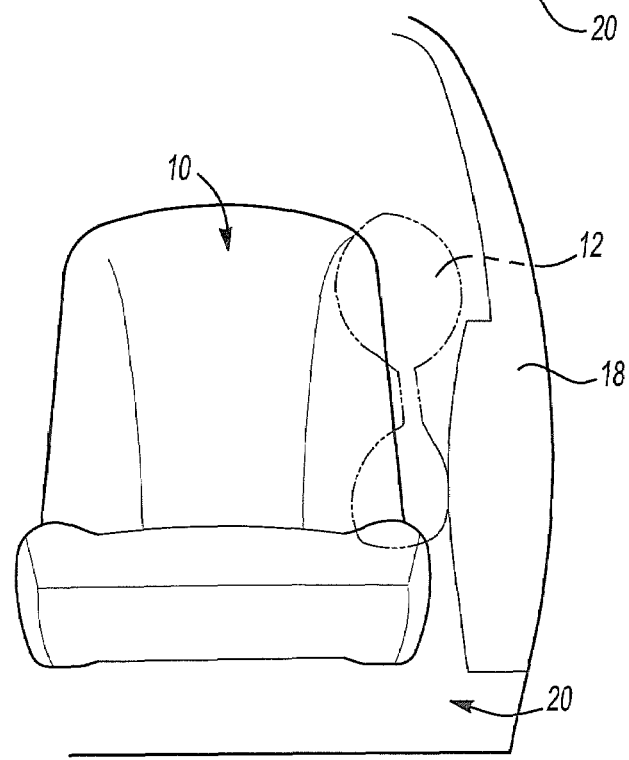
FIG. 2 is a front elevation view of a vehicle seat in a vehicle with the airbag of the present invention shown in its inflated condition.

Referring to FIGS. 1 and 2, a vehicle seat 10 is shown with an airbag 12 in its inflated position and an inflator 16. The airbag 12 is shown as it is inflated on one side of the vehicle seat 10. Referring specifically to FIG. 2, the airbag 12 is inflated and assumes an hour-glass shape in the space between the door 18 of a vehicle 20 and the vehicle seat 10.

Referring to FIG. 3, the airbag 12 is shown in greater detail. The airbag 12 has a shoulder loading portion 22 that is inflated adjacent to the shoulder of a seat occupant. The shoulder loading portion 22 is intended to be large enough to be positioned adjacent to the shoulder of a person who is between $5^{th}$ percentile female and $50^{th}$ percentile male of the height of the average person. A central portion 24 is provided in the center of the airbag 12 and a pelvis loading portion 26 is provided below the central portion 24. The pelvis loading portion 26 when inflated is disposed adjacent the hip of a occupant of the seat who is between the $5^{th}$ percentile female and the $50^{th}$ percentile male of the height of the average person. The pelvis loading portion 26 extends forwardly to an extent that a person's hip that is a 5% female anthropomorphic dummy height standard is covered and protected.

The airbag 12 has a B-shaped configuration. While the shape is not strictly a B-shape the shape of the bag may be described as having a vertical axis V which depending upon the orientation of the seat may be somewhat inclined rearwardly. The shoulder loading portion 22 is disposed above the central portion. The pelvis loading portion 26 is disposed below the central portion.

A shoulder portion vent 28 is provided in the shoulder loading portion 22. A hip portion vent 30 is provided in the pelvis loading portion 26. The vents 28, 30 are provided to permit air to escape from the airbag 12.

Referring to FIGS. 3 through 5, the construction of the airbag 12 is shown to include an inside wall 34 and an outside wall 36 that are joined together to form the basic construction of the airbag 12. The fabric from which the walls and other parts of the airbag are formed may have a silicone coating for increasing the extent of air pressure retention of the air bag. An inner reinforcement layer 38 is sewn to the inside wall 34. An outer reinforcement layer 40 is sewn to the outside wall 36. The inner and outer reinforcement layers 38, 40 are connected to the inside wall 34 and outside wall 36 by reinforcement layer attachment seams 42. Additional reinforcement layers may be provided to strengthen certain areas.

An expansion control baffle 46 may be provided in the central portion 24 to control the rate of inflation of the different portions of the airbag. The length of the expansion control baffle 46 may be changed to control the pressure in the shoulder loading portion 22 and the pelvis loading portion 26. The length of the baffle 46 may extend to the full width of the central portion 24. Gas is permitted to flow past the baffle 46 through a gap 48, or window. Pressure distribution may be tuned by controlling the size of the gap 48, or window. Pressure may also be controlled or tuned by changing the location of the gap 48, or window, relative to the inflator 16. Additional baffles may be provided to control pressure and facilitate shaping the airbag when deployed.

A peripheral seam 50 is provided around the periphery of the airbag 12 that joins the inside wall 34 and outside wall 36 together about the periphery.

Referring to FIGS. 6-7, the inflator 16 is disposed within an inflator housing 51 that has a port 52 that is directed downwardly into the pelvis loading portion 26 of the airbag 12. The majority of the gas expelled from the inflator 16 is directed toward the pelvis loading portion 26. The inflator 16 is assembled within the inflator housing 51 that also has a side port 54. Side port 54 ports gas from the inflator 16 into the central portion 24 of the airbag 12. Gas flowing from the inflator 16 into the shoulder loading portion 22 is initially directed into the central portion 24 and pelvis loading portion 26 and then flows into the shoulder loading portion 22. This has the effect of initially reducing the volume of gas flowing into the shoulder loading portion 22. Access holes 56 are provided in the inflator housing 51 to facilitate securing the inflator 16 to a vehicle seat 10.

The pressure within the pelvis loading portion 26 is preferably between 20 and 30 psi when loaded by an occupant. The pressure in the shoulder loading portion 22 is slightly lower and may be between 15 and 25 psi when loaded by an occupant.

The differential pressure between the shoulder loading portion 22 and pelvis loading portion 26 may be tuned by several different approaches. One way is to modify the mounting height of the inflator 16 relative to the airbag 12. By placing the inflator 16 lower in the airbag 12 the pelvis loading portion 26 will tend initially to fill with a greater volume and result in a higher pressure during inflation. Another way to control the level of pressure between the shoulder loading portion 22 and the pelvis loading portion 26 is to control the internal air flow through the central portion 24. For example, the central portion 24 may be configured to provide a reduced cross-section when inflated. Alternatively, an expansion control baffle 46 may provided of varying length or additional expansion control baffles may be provided within the central portion 24. In addition, the location of the baffle 46 relative to the side port 54 may be determined based upon the desired relative pressures.

Referring to FIGS. 6 and 7, the inflator 16 and inflator housing 51 are shown in greater detail. The inflator housing 51, as previously described, includes a port 52 that is oriented downwardly. Side port 54 is oriented to expel gas into the central portion 24. Access holes 56 are provided in the side walls of the inflator housing 51 to receive fasteners 60, such as bolts or studs, that secure the inflator 16, inflator housing 51, and airbag 12 to a vehicle seat back frame (not shown). The fasteners 60 extend through holes 62 provided in the central portion 24 of the airbag 12. The reinforcement layers 38, 40 that define the central portion 24 provide added burst strength adjacent to the inflator 16. Pressure distribution may be controlled in part by changing the position of the inflator 16 within the inflator housing 51. Alternatively, pressure distribution may be controlled by changing the position of the airbag 12 relative to the inflator housing 51 by relocating the holes 62 in the airbag 12.

While the best mode for carrying out the invention has been described in detail, those familiar with the art to which this invention relates will recognize various alternative designs and embodiments for practicing the invention as defined by the following claims.

What is claimed:

1. An airbag system for protecting an occupant of a vehicle, comprising:
    a gas generator that generates a gas in response to receiving an activation signal, the gas generator having at least one port through which the gas is expelled;
    an airbag having a pelvis loading portion, a shoulder loading portion and a central portion, the gas generator being assembled adjacent to the central portion and the gas being expelled directly towards a baffle that splits the gas between the pelvis loading portion and the shoulder loading portion with the gas from the central portion being expelled indirectly into the shoulder portion through the central portion;
    wherein the gas generator is attached to a vehicle seat back and the airbag and wherein the gas generator is positioned within the airbag with the at least one port oriented to direct the gas directly toward the baffle with which the port is aligned with a greater portion of the gas flow being directed downwardly into the pelvis loading portion and with a lesser portion of the gas flow being directed into the central portion; and
    wherein the airbag is defined by the pelvis loading portion that is disposed below the central portion and the shoulder loading portion that is disposed above the central portion wherein the pelvis loading portion has an upper surface that extends forwardly and downwardly from the central portion and a lower surface that extends perpendicularly relative to a vertical axis V of the airbag that is aligned lengthwise relative to the gas generator, wherein the shoulder portion has a lower surface that extends forwardly and upwardly from the central portion and an upper surface that extends perpendicularly relative to the vertical axis V of the airbag.

2. The airbag system of claim 1 wherein the airbag has an inside wall and an outside wall that each extend over the pelvis loading portion, the central portion and shoulder loading portion, wherein the central portion has an inner reinforcement layer that is secured to the inside wall and an outer reinforcement layer that is secure to the outside wall.

3. The airbag system of claim 1 wherein the central portion has reduced cross-sectional area when fully inflated than both the cross-sectional area of the pelvis loading portion and the shoulder loading portion when fully inflated and wherein the degree of reduction of the cross-sectional area of the central portion may be controlled by providing the baffle that extends partially across the central portion.

4. The airbag system of claim 1 wherein the central portion has reduced cross-sectional area when fully inflated than both the cross-sectional area of the pelvis loading portion and the shoulder loading portion when fully inflated and wherein the degree of reduction of the cross-sectional area of the central portion may be controlled by sewing partially across the central portion to restrict gas flowing to the shoulder loading portion.

5. The airbag system of claim 1 further comprising a first vent hole provided in the pelvis loading portion and a second vent hole provided in the shoulder loading portion.

6. An airbag assembly for a vehicle occupant protection system, comprising:
    an inflatable fabric enclosure having a pelvis loading portion, a shoulder loading portion and a central portion, the pelvis loading portion extending downwardly and forward from the central portion, the shoulder loading portion extending upwardly and forward from the central portion, the central portion being limited in a forward direction of extension corresponding to a front side of the seat back that is engaged by an occupant's back;
    an inflator assembled to the inflatable fabric enclosure at the central portion, the inflator having a port through which a volume of a gas is dispensed, wherein the gas is supplied to the enclosure in a controlled manner to provide pressure at a first level in the pelvis loading portion and at a second level in the shoulder portion, wherein the second level is less than the first level, the gas being permitted to flow through the central portion with a baffle in the central portion maintaining the difference between the first and second levels during a deployment phase by dividing the flow of gas between an upper side of the baffle and a lower side of the restriction.

7. The airbag assembly of claim 6 wherein the airbag has an inside wall and an outside wall that each extend over the pelvis loading portion, the central portion and shoulder loading portion, wherein the central portion has an inner reinforcement layer that is secured to the inside wall and an outer reinforcement layer that is secured to the outside wall.

8. The airbag assembly of claim 6 wherein the central portion has reduced cross-sectional area when fully inflated than both the cross-sectional area of the pelvis loading portion and the shoulder loading portion when fully inflated and wherein the degree of reduction of the cross-sectional area of the central portion may be controlled by providing sewn partial baffles that extend partially across the central portion to a gap in the central portion that is located immediately adjacent the inflator.

9. The airbag assembly of claim 6 wherein the inflator is attached to a vehicle seat back and the airbag and wherein the inflator is positioned within the airbag with a port oriented to direct the gas directly toward the baffle with a greater portion of the gas being directed downwardly into the pelvis loading portion and with a lesser portion of the gas flow being directed into the central portion.

10. The airbag assembly of claim 6 wherein the airbag has an hour-glass defined by the pelvis loading portion and the shoulder loading portion that are both laterally wider than the central portion, wherein the pelvis loading portion is disposed below the central portion and the shoulder loading portion is disposed above the central portion.

* * * * *